United States Patent
Gasque, Jr.

(10) Patent No.: US 7,385,390 B1
(45) Date of Patent: *Jun. 10, 2008

(54) DEVICE FOR ESTABLISHING A CUTTING POINT FROM A BLIND SIDE OF A STRUCTURE

(76) Inventor: Samuel N. Gasque, Jr., 394 Old Tanglewood Trail, Hendersonville, NC (US) 28739

( * ) Notice: Subject to any disclaimer, the term of this patent is extended or adjusted under 35 U.S.C. 154(b) by 0 days.

This patent is subject to a terminal disclaimer.

(21) Appl. No.: 11/350,241

(22) Filed: Feb. 8, 2006

Related U.S. Application Data

(63) Continuation-in-part of application No. 11/285,640, filed on Nov. 22, 2005.

(60) Provisional application No. 60/731,683, filed on Oct. 31, 2005.

(51) Int. Cl.
*G01R 19/00* (2006.01)
*G01V 3/08* (2006.01)
*G01B 7/14* (2006.01)

(52) U.S. Cl. .............. 324/207.2; 324/207.26; 324/67; 324/260

(58) Field of Classification Search ............... 324/67, 324/207.2, 252, 260, 207.26, 66, 133, 556, 324/326
See application file for complete search history.

(56) References Cited

U.S. PATENT DOCUMENTS

| | | | |
|---|---|---|---|
| 3,836,848 A | 9/1974 | Blevins | |
| 4,998,058 A | 3/1991 | Tofte et al. | |
| 5,434,500 A | 7/1995 | Hauck et al. | |
| 5,929,757 A | 7/1999 | Sternal et al. | |
| 6,137,281 A * | 10/2000 | Phillips et al. | ........... 324/67 |
| 6,441,599 B1 | 8/2002 | Kropidlowski | |
| 6,452,097 B1 | 9/2002 | DeWall | |
| 6,708,421 B1 | 3/2004 | Crorey | |
| 6,894,508 B2 * | 5/2005 | Sanoner et al. | ........... 324/662 |
| 6,927,560 B2 | 8/2005 | Pedigo et al. | |
| 2003/0210027 A1 | 11/2003 | Pedigo et al. | |

OTHER PUBLICATIONS

"Hall-Effect Sensor Selection Guides" dated Oct. 28, 2005 from www.allegromicro.com/hall; pp. 1-2.
"Ratiometric Linear Hall-Effect Sensors for High-Temperature Operation" dated Oct. 28, 2005 from www.allegromicro.com/sf/1321; pp. 1-3.
"Linear Hall-Effect Sensors" by Joe Gilbert and Ray Dewey, dated Dec. 3, 1998 from Allegro MicroSystems, Inc.; pp. 1-12.

* cited by examiner

*Primary Examiner*—Jay M Patidar
(74) *Attorney, Agent, or Firm*—Turner Padget Graham & Laney, P.A.

(57) ABSTRACT

A blind spot targeting system for establishing a cutting point includes a locator with a housing having an indicator and a signal-sensing device. The housing has a hole therethrough, and the indicator is in electronic communication with the signal-sensing device for indicating a cutting point on a first side of a structure. A transmitter is also included, which has a complementary hole therethrough. The transmitter is for placement on a second side of the structure for emitting a signal, which the signal-sensing device senses. The indicator in communication with the signal-sensing device indicates alignment of the hole and the complementary hole to establish the cutting point for cutting through the hole into the first side of a structure and possibly through the second side of the structure in a direction of the complementary hole.

25 Claims, 7 Drawing Sheets

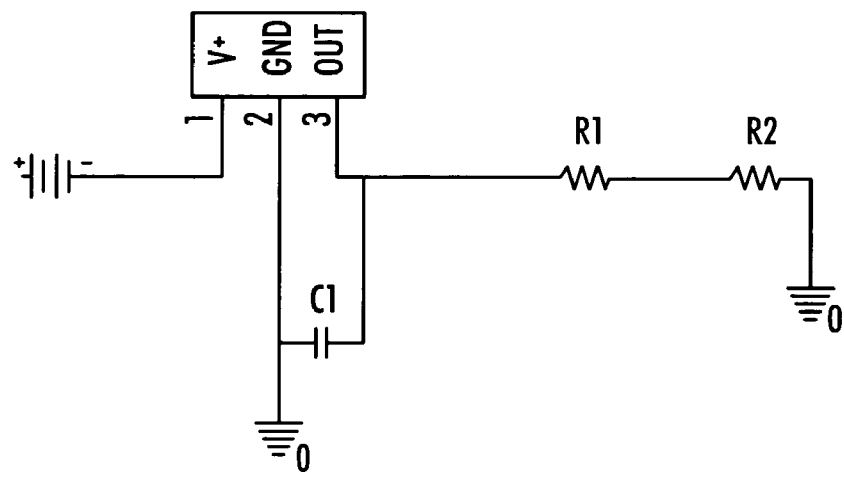
FIG. 6A
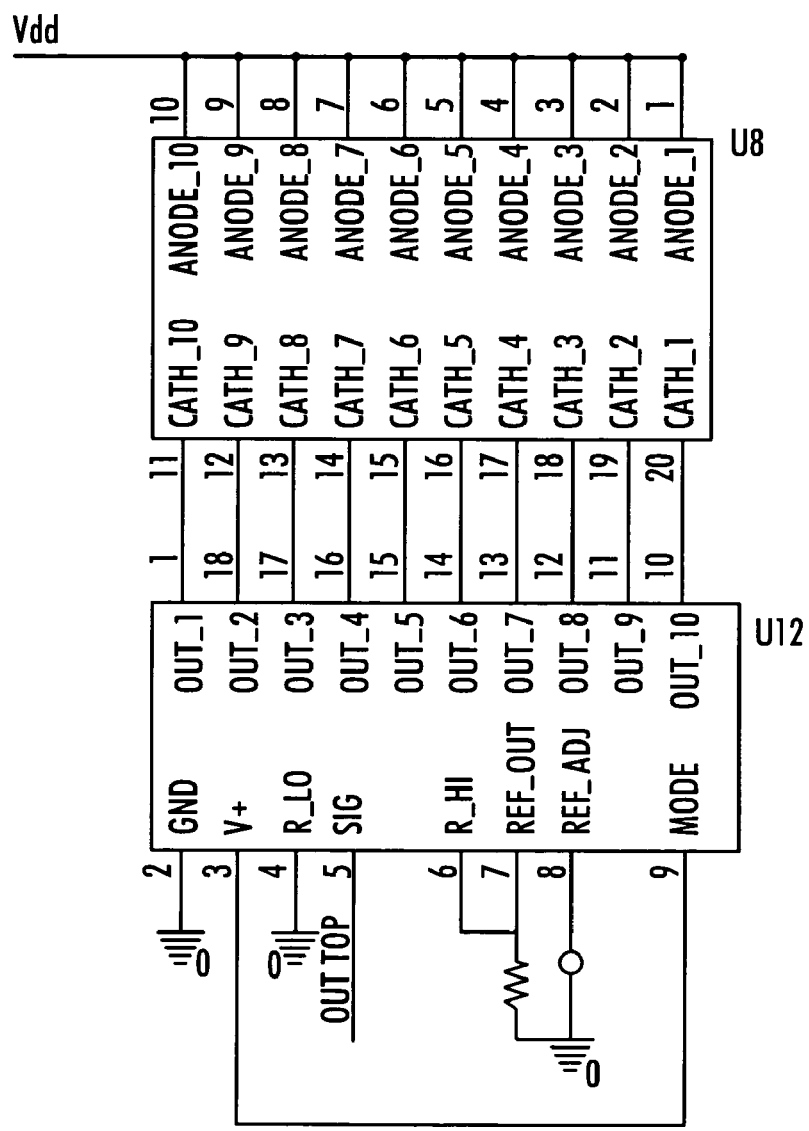

DEVICE FOR ESTABLISHING A CUTTING POINT FROM A BLIND SIDE OF A STRUCTURE

RELATED APPLICATIONS

The present application is a continuation-in-part application of and claims priority to co-pending U.S. patent application Ser. No. 11/285,640, filed Nov. 22, 2005, entitled "Blind Spot Targeting System", which claims benefit of U.S. Provisional Patent Application Ser. No. 60/731,683 filed Oct. 31, 2005.

BACKGROUND OF THE INVENTION

In residential or commercial construction, precisely determining a reference point on one side of a structure such as a wall, floor or ceiling from an opposite side of the structure is required to avoid unnecessary trial and error as well as damage to the structure. For example, when installing a ceiling fan, a workman must know exactly where to cut a hole on the one side of the ceiling in order to line up with an incoming conduit on the opposite side of the ceiling, in an attic for instance, without cutting into a truss or beam. Likewise, if the workman cuts from the attic side without a precise reference point, the hole for the ceiling fan may be off-center in the room below. By way of further example, a customer will request that a cable or satellite television technician drill a hole from outside of the customer's house so that a television cable can be routed into a lower corner of a room to be as unobtrusive as possible. Unfortunately, most installation technicians do not have the time or tools to make precision measurements and their cable installations are often unsatisfactory.

Reference points are determined and marked usually by making a number of measurements on one side of the structure and then repeating the measurements on the opposite side of the structure. A hole is then drilled that extends from one side of the structure to the other side of the structure. This approach has several drawbacks. Foremost, manual measurements are time consuming due to the large number of measurements that must be made and due to the difficulty in transferring those measurements to the opposite side of the structure. This approach often leads to numerous unnecessary holes being drilled that of course must be patched or repaired to return the structure to its original condition. Ironically, the unnecessary holes are often due to the multiple measurements, which are meant to provide precision but can be confusing and lead to mismarked reference points. Moreover, this conventional measurement approach is costly due to the time associated with performing the initial measurements as well as the time and cost associated with patching or otherwise repairing the unnecessary holes.

Various devices available in the market have attempted to automate measurement processes or electronically locate reference points for cutting or drilling from blind sides of structures. However, these devices tend to be bulky and excessively complex, especially for a layman for use in a home project. Moreover, for an occasional home project, the existing devices can be cost prohibitive.

BRIEF SUMMARY OF THE DISCLOSURE

The present invention is directed in general to a system for precisely marking a reference point on a surface in order to drill, cut or otherwise penetrate through the reference point from a blind spot. The system generally includes a locator or sensor and a marker or transmitter. The transmitter is placed on a blind side of a surface, and the locator is used to locate or sense a signal emanating from the transmitter using one or more indicators on the locator. The indicators provide visual and audible targeting cues to mark the opposing side of the surface precisely opposite the transmitter. The component parts of the invention are simple and economical to manufacture, assemble and use, and other advantages of the invention will be apparent from the following description and the attached drawings, or can be learned through practice of the invention.

According to an aspect of the invention, a blind spot targeting system for establishing a reference point on a structure includes a locator including a housing for an indicator and a signal sensing device, the housing defining a hole therethrough, the indicator being in electronic communication with the signal sensing device for indicating a cutting point on a first side of a structure; and an emitter defining a complementary hole therethrough, the emitter being configured for placement on a second side of the structure for emitting a signal therefrom, the signal sensing device being configured to sense the signal emitted from the emitter and being further configured to communicate the sensed signal to the indicator to indicate alignment of the hole and the complementary hole, the locator being further configured for cutting through the hole into the first side of the structure in a direction of the complementary hole as the emitter emits the signal from the second side of the structure. In this aspect, the housing is a donut-shaped or a disc-shaped housing.

Also in this aspect of the invention, the indicator is a light emitting diode bar. The light emitting diode bar includes at least two light emitting diode bays. The first light emitting diode bay is configured to emit light when the signal-sensing device senses the emitted signal, the second light emitting diode bay being configured to emit light when the holes and the complementary hole are aligned. The light emitting diode bar includes at least two light emitting diode bays, the first light emitting diode bay being configured to emit a first color of light when the signal sensing device senses the emitted signal, the second light emitting diode bay being configured to emit a second color of light when the holes and the complementary hole are aligned.

The indicator in this aspect can include at least four light emitting diode bars spaced equally apart about the housing, each of the four light emitting diode bars having at least two light emitting diode bays, at least one of the first light emitting diode bays being configured to emit light when the signal sensing device senses the emitted signal, the second light emitting diode bays being configured to emit light when the holes and the complementary hole are aligned.

Also in this aspect, the indicator can include at least four light emitting diode bars spaced equally apart about the housing, each of the four light emitting diode bars having at least ten light emitting diode bays, at least one of the first light emitting diode bays being configured to emit light when the signal sensing device senses the emitted signal, the tenth light emitting diode bays being configured to emit light when the holes and the complementary hole are aligned.

Further in this aspect, the signal-sensing device can include a Hall-effect device configured to sense the emitted signal from the emitter, and the emitter can include a magnet, the Hall-effect device being configured to sense a magnetic field emitted from the magnet. The magnet can be a permanent magnet such as neodymium—although many other permanent magnets can be used instead—an electromagnet or a pulsed electromagnet.

The indicator in this aspect of the invention can be or include an audio device. The audio device can emit a sound from about fifteen inches to about ten inches proximate the emitter. The audio device can emit a chirping tone from about fifteen inches to about ten inches proximate the emitter. The audio device when proximate about ten inches to about one inch from the emitter can increase a rate of the chirping tone or increase a loudness level of the chirping tone. The audio device can also emit a steady tone from about 0.25 inches to about one inch proximate the emitter.

Also in this aspect of the invention, the hole and the complementary hole are from about 0.25 inches in diameter to about two inches in diameter, the hole and the complementary hole being configured for passage of one of a nail, a screw, a rivet or a drill bit or any other penetrating tool, workpiece, or device.

Further in this aspect of the invention, a power switch is provided to turn the signal-sensing device on and off. A power source is also provided to power the signal-sensing device. The power source can be a battery, such as a 9-volt battery, disposed in the housing.

This aspect of the invention also includes means for attaching the emitter to the structure, which can be a suction cup, an adhesive tape, a pin, a nail, a hook, or a hook and a loop fastening system or combinations of these.

Likewise, this aspect of the invention can include means for attaching the signal-sensing device to the structure, which can be a suction cup, an adhesive tape, a pin, a nail, a hook, or a hook and a loop fastening system or combinations of these.

In another embodiment of the invention, a blind spot targeting system for establishing a reference point on a structure can includes a locator including a housing for an indicator and a magnetic field sensor, the housing defining a hole therethrough, the indicator being in electronic communication with the magnetic field sensor for indicating a cutting point on a first side of a structure; and a magnetic emitter defining a complementary hole therethrough, the magnetic emitter being configured for placement on a second side of the structure for emitting a magnetic signal therefrom, the magnetic field sensor being configured to sense the magnetic signal emitted from the magnetic emitter and being further configured to communicate the sensed magnetic signal to the indicator to indicate alignment of the hole and the complementary hole, the locator being further configured for cutting through the hole into the first side of the structure in a direction of the complementary hole as the magnetic emitter emits the magnetic signal from the second side of the structure. The housing is a donut-shaped housing or a disc-shaped housing in this aspect.

Also in this aspect of the invention, the indicator can be a light emitting diode bar. The light emitting diode bar includes at least two light emitting diode bays, the first light emitting diode bay being configured to emit light when the magnetic field sensor senses the emitted magnetic signal, the second light emitting diode bay being configured to emit light when the holes and the complementary hole are aligned.

The indicator in this aspect can include at least four light emitting diode bars spaced equally apart about the housing, each of the four light emitting diode bars having at least two light emitting diode bays, at least one of the first light emitting diode bays being configured to emit light when the magnetic field sensor senses the emitted magnetic signal, the second light emitting diode bays being configured to emit light when the holes and the complementary hole are aligned.

The magnetic field sensor in this aspect is a Hall-effect device being configured to sense the emitted magnetic signal from the magnetic emitter. The magnetic emitter can be a permanent magnet, an electromagnet, or a pulsed electromagnet.

The indicator is an audio device. The audio device is configured to emit a chirping tone from about fifteen inches to about ten inches proximate the magnetic emitter. The audio device proximate about ten inches to about one inch from the magnetic emitter increases a rate of the chirping tone. The audio device proximate about ten inches to about one inch from the magnetic emitter increases a loudness level of the chirping tone. The audio device is configured to emit a steady tone from about 0.25 inches to about one inch proximate the magnetic emitter.

Further in this aspect of the invention, the hole and the complementary hole are from about 0.25 inches in diameter to about two inches in diameter, the hole and the complementary hole being configured for passage of one of a nail, a screw, a rivet or a drill bit.

Also in this aspect, a power switch is included, which turn the magnetic field sensor on and off. A portable power source is included, which is configured to power the magnetic field sensor.

This aspect of the invention further includes a non-magnetic casing disposed about the magnetic emitter. A suction cup, an adhesive tape, a pin, a nail, a hook, or a hook and a loop fastening system is included for attaching the magnetic emitter to the structure. A suction cup, an adhesive tape, a pin, a nail, a hook, or a hook and a loop fastening system is included for attaching the magnetic field sensor to the structure.

A method of using a blind spot targeting system for establishing a reference point on a structure includes the steps of attaching a magnetic emitter on a first side of a structure, the magnetic emitter defining a hole therethrough and being configured to emit a magnetic field; activating a locator defining a complementary hole therethrough and having a targeting indicator and a magnetic field sensing device in communication with the targeting indicator, the targeting indicator being configured to produce a signal when proximate the magnetic field, the signal being strongest when directly opposite the magnetic emitter; approaching a second side of the structure with the locator approximately opposite the magnetic emitter on the first side of the structure; positioning the locator on the second side of the structure according to a strength of the signal produced by the targeting indicator; and marking the second side of the structure through the complementary hole in the locator when indicated by the signal produced by the targeting indicator.

According to the method in this aspect of the invention, the indicator includes at least four light emitting diode bars spaced equally apart about the locator, each of the four light emitting diode bars having at least two light emitting diode bays, at least one of the first light emitting diode bays being configured to emit light when the magnetic field sensing device senses the magnetic field, the second light emitting diode bays being configured to emit light when the holes and the complementary hole are aligned.

Further steps according to the method include repositioning the locator in a direction of lighted ones of the light emitting diode bars and away from unlighted ones of the light emitting diode bars; stopping the locator over the second side of the structure when the light emitting diode bays of the light emitting diode bars are lighted evenly.

Also according to the method, the indicator includes an audio device being configured to emit a chirping tone from about fifteen inches to about ten inches proximate the magnetic emitter, the audio device being further configured to increase a rate of the chirping tone from about ten inches to about one inch from the magnetic emitter, and the audio device being configured to emit a steady tone from about 0.25 inches to about one inch proximate the magnetic emitter. The method calls for the step of stopping the locator over the second side of the structure when the audio device emits the steady tone. Further, the method includes the step of attaching the locator to the second side of the structure by one of suction cup, an adhesive tape, a pin, a nail, a hook, or a hook and a loop fastening system. Additionally, the method includes the step of cutting into the second side of the structure through the complementary hole in the locator in a direction of the magnetic emitter. The method also includes the step of pulsing the magnetic emitter to distinguish the magnetic field from an unrelated magnetic field. The emitter can be programmed to pulse or be pulsed by the locator according to yet another aspect of the invention.

In another aspect of the invention, a blind spot targeting system for establishing a reference point on a structure includes a locator including a housing defining a hole therethrough; an indicator connected to the housing; a signal sensing device disposed in the housing, the indicator being in electronic communication with the signal sensing device for indicating a cutting point on a first side of a structure, the signal sensing device being configured to sense an AC field emanating from an electrical cable proximate the cutting point, the indicator being activated by the AC field sensed by the signal sensing device to indicate a position of the electrical cable for avoidance of the electrical cable; and an emitter defining a complementary hole therethrough, the emitter being configured for placement on a second side of the structure for emitting a signal therefrom, the signal sensing device being further configured to sense the signal emitted from the emitter and being configured to communicate the sensed signal to the indicator to indicate alignment of the hole and the complementary hole, the locator being further configured for cutting through the hole into the first side of the structure in a direction of the complementary hole as the emitter emits the signal from the second side of the structure. The AC field in this aspect can be an AC magnetic field emanating from the electrical cable, or the AC field can be an AC electrical field emanating from the electrical cable in a live circuit, the electrical cable having no power applied thereto. Also in this aspect of the invention, the housing can be attached to or part of a stud finder, a laser level or other construction device, including combinations of such devices.

In a further aspect of the invention a construction device for establishing a reference point on a structure includes a housing with an indicator disposed thereon; a signal sensing device connectable to the housing, the indicator being in electronic communication with the signal sensing device for indicating a cutting point on a first side of a structure; and an emitter being configured for placement on a second side of the structure for emitting a signal therefrom, the signal sensing device being configured to sense the signal emitted from the emitter and being further configured to communicate the sensed signal to the indicator to indicate alignment of the signal sensing device and the emitter for cutting into the first side of the structure in a direction of the emitter as the emitter emits the signal from the second side of the structure.

In this aspect of the invention, the construction device can be a stud finder, a laser level, a blind spot targeting system and combinations of these and other devices for locating wires, studs and the like and for taking construction measurements.

Further in this aspect, the signal sensing device is configured to sense an AC field emanating from an electrical cable proximate the cutting point, the indicator being activated by the AC field sensed by the signal sensing device to indicate a position of the electrical cable for avoidance of the electrical cable.

The signal emanating from the emitter in this aspect of the invention can be a magnetic field signal, which can be an AC or a DC signal.

In yet another aspect of the invention, a construction device for establishing a reference point on a structure includes a housing with an indicator disposed thereon; a signal sensing device connectable to the housing, the indicator being in electronic communication with the signal sensing device for indicating a cutting point on a first side of a structure, the signal sensing device being configured to sense an electrical field emanating from an electrical cable proximate the cutting point, the indicator being activated by the electrical field sensed by the signal sensing device to indicate a position of the electrical cable for avoidance of the electrical cable; and an emitter being configured for placement on a second side of the structure for emitting a signal therefrom, the signal sensing device being further configured to sense the signal emitted from the emitter and being configured to communicate the sensed signal to the indicator to indicate alignment of the signal sensing device and the emitter for cutting into the first side of the structure in a direction of the emitter as the emitter emits the signal from the second side of the structure. The construction device in this aspect of the invention can be a stud finder, a laser level, a blind spot targeting system and combinations of these and other construction devices.

In this aspect of the invention, the electrical field emanating from the electrical cable can be an AC or DC field. The signal from the emitter can be a magnetic field signal, more particularly, an AC or DC signal.

BRIEF DESCRIPTION OF THE DRAWINGS

Further aspects and advantages of the invention will be apparent from the following description, or can be learned through practice of the invention, in combination with the drawings, which serve to explain the principles of the invention but by no means are intended to be exhaustive of all of possible manifestations of the invention. At least one embodiment of the invention is shown in the drawings in which.

DETAILED DESCRIPTION OF THE DISCLOSURE

Figure 1:
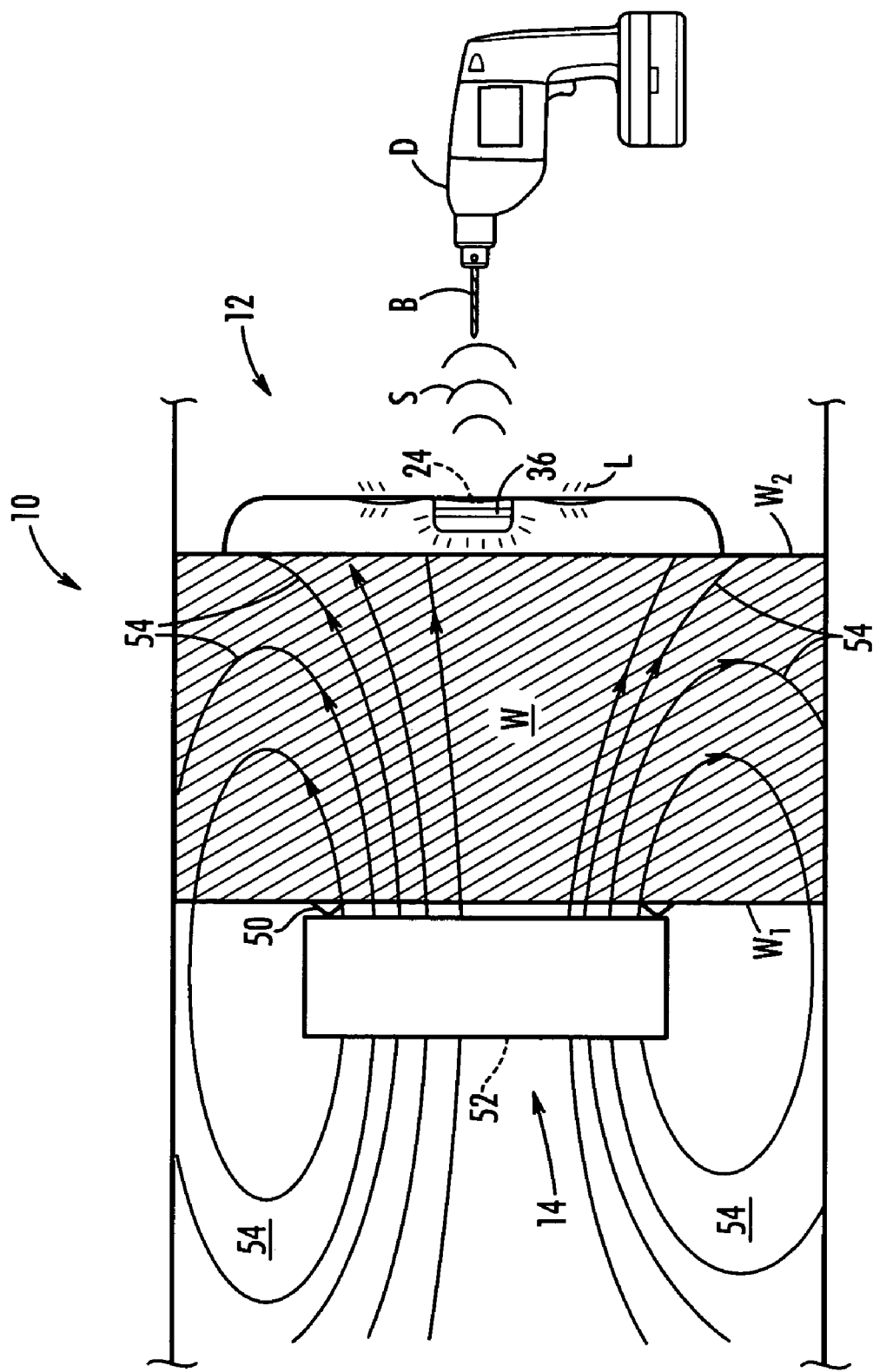
FIG. 1 is a side elevational view one embodiment of a blind spot targeting system according to an aspect of the present invention.

Detailed reference will now be made to the drawings in which examples embodying the present invention are shown. The detailed description uses numerical and letter designations to refer to features of the drawings. Like or similar designations of the drawings and description have been used to refer to like or similar parts of the invention.

The drawings and detailed description provide a full and written description of the invention, and of the manner and process of making and using it, so as to enable one skilled in the pertinent art to make and use it, as well as the best mode of carrying out the invention. However, the examples set forth in the drawings and detailed description are provided by way of explanation only and are not meant as limitations of the invention. The present invention thus includes any modifications and variations of the following examples as come within the scope of the appended claims and their equivalents.

The figures broadly embody a blind spot targeting system, designated in general by the element number 10. The blind spot targeting system 10 generally includes a locator or sensor 12 and a transmitter (alternatively, emitter or marker) 14. As will be described in greater detail and by exemplary operation below, the transmitter 14 is attached to one side of a surface and a user positions the locator 12 on the opposing side of the surface to locate the transmitter 14. Generally, the locator 12 provides at least one audible or visual cue as the user aligns the locator 12 over the position opposite the transmitter 14.

The blind spot targeting system 10 can be used by a construction professional, a "do-it-yourselfer" or other user who wishes to penetrate a structure such as by cutting or drilling a hole in the structure but cannot drill from a side of the structure where the user has identified the reference point to be drilled. For example, if the user is running pipe in a basement and needs to run through an interior wall, the user may not be able to drill from the side they mark off of the existing pipe. Therefore, the blind spot targeting system 10 can used to mark and drill from the unobstructed side. By way of further example, if the user is trying to drill through a wall that is wider than a length of the user's drill bit, the user would need to drill from one side of the wall then drill again from the other side, which requires lining up the two drilled holes. This is typically very difficult and measurements must be made very precisely to get a continuous hole. With the blind spot targeting system 10, a first hole can be drilled, the transmitter 14 placed over that drilled hole and the locator 12 used to determine exactly where to drill the continuation of the first hole on the other side of the wall.

Although the figures, which are about to be described in detail, show a disc-shaped or donut-shaped locator 12 and a donut-shaped or toroidal-shaped transmitter 14, the skilled artisan will instantly appreciate that a variety of shapes, dimensions, component placements and material makeup of the components can be substituted for the examples shown and therefore the invention is not limited to the examples shown in the figures.

With reference now to FIG. 1, the locator 12 and the transmitter 10 are shown substantially aligned spaced apart from each other by a structure such as a wall, ceiling, floor or the like, hereinafter referred to as structure or wall W. As shown, the transmitter 14 is attached to a first side $W_1$ of the wall W using one or more attachment devices such as a suction cup 50. The skilled artisan will instantly recognize that the attachment devices can be suction cups 50, reusable double-sided adhesive tape, pins, nails, hooks, hook and loop fastening systems or other known attachment devices for temporarily attaching the transmitter 14 to the surface $W_1$. On an opposing side $W_2$ of the wall W, a user (not shown) turns on the locator 12 as will be described in greater detail below and approaches the opposing side $W_2$ of the wall W approximately in the area of the transmitter 14.

FIG. 1 further shows that the user has located the transmitter 14 with the locator 12 using one or more cues provided by the locator 12. In this example, the locator 12 includes a plurality of light emitting diode (LED) bars 36, which are caused to be lighted by the locator 12 when the locator 12 senses a signal emitting from the transmitter 14. As shown, the LED bars 36 emit light waves L, which can vary in intensity or color as discussed below. Also in this example, the locator 12 includes an audio chip or device 34 (see FIG. 3), which will emit an audible tone S as the locator 12 nears the transmitter 14.

As further shown in FIG. 1, the transmitter 14 includes an emitter or magnet 44 (see FIG. 4), which emits a magnetic field indicated in this example by lines of magnetic flux 54. The lines 54 are schematically shown emitting from FIG. 1 (i.e., in a "z-axis" toward the viewer). Thus, in this example, the locator 12 senses the lines of magnetic flux 54 and causes the audio chip 34 and/or the LED bars 36 to activate as will be further described below. The skilled artisan will instantly appreciate that the emitter 44 is not limited to a magnet but can be a radio frequency or other form of emission and the locator 12 can use a sensor configured to sense these other forms of emission.

FIG. 1 also shows that the locator 12 can either be held against the opposing side of the reference point on the surface $W_2$ by the user, or the locator 12 can be attached temporarily to the surface $W_2$ as will be described below. Accordingly, the user will mark and cut through the locator 12 using a drill D in this example. More specifically, the locator 12 includes a hole 24 through which a drill bit B of the drill D can be inserted for making a hole in the wall W. Another hole 20 (see FIG. 3) aligns with the hole 24 such that the drill bit B can enter the wall W. Similarly, the transmitter 14 includes a hole 52 through which the drill bit B can either enter from the surface $W_2$, or the user can reverse the locator 12 and the transmitter 14 and drill from the other surface $W_1$. Additionally, the user can move the drill D to the surface $W_1$ and drill through the hole 52 of the transmitter 14.

Figure 2:
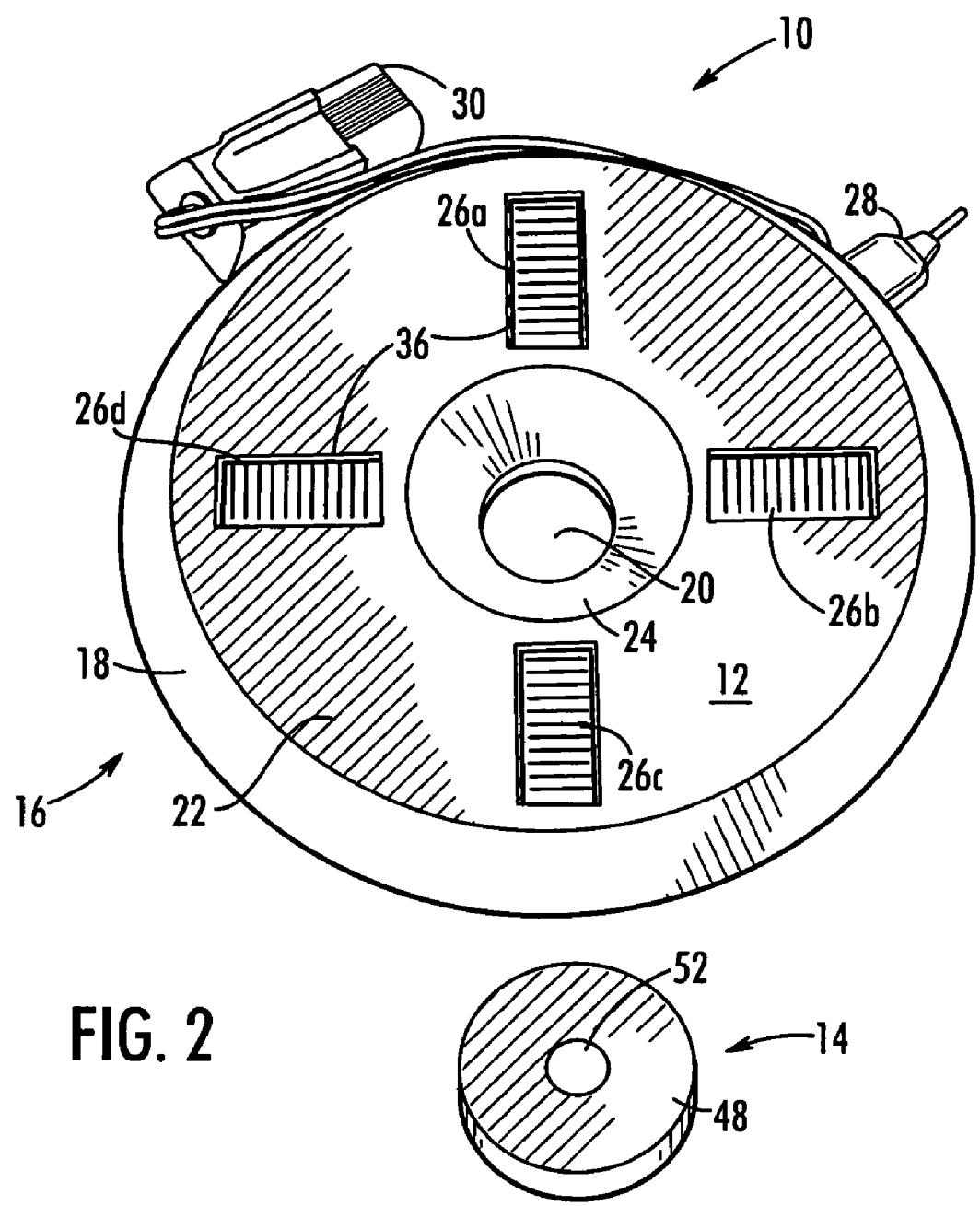
FIG. 2 is a top perspective view of the blind spot targeting system as in FIG. 1.

Turning now to FIG. 2, the locator 12 and the transmitter 14 of the blind spot targeting system 10 are shown most clearly. In this example, the locator 12 includes a housing or shell 16 with a base 18 and a top 22 that are mated together by spin welding, snap fitting, screws or the like, or combinations of these and other attachment devices and methods. As shown, the base 18 has the hole 20 briefly introduced above, which is aligned with the complementary hole 24 of the top 22.

FIG. 2 further shows an on/off switch 28, which powers the locator 12 on and off by activating or deactivating a power supply such as a battery 30. In this example, a standard 9-volt battery is used for the battery 30. The skilled artisan will instantly appreciate that the switch 28 can be a push-button switch, a contact switch, a pressure or a "dead man's" switch or other device for establishing an electrical circuit to power the locator 12. Likewise, the skilled artisan will appreciate that the battery 30 can be other types and numbers of batteries and can be installed within the housing 16. Therefore, the locator 12 is not limited to the example shown.

FIG. 2 also shows a plurality of LED receptacles 26*a-i* (where i indicates a theoretically infinite number of receptacles) formed in the top 22. A respective plurality of the LED bars 36 is disposed in the LED receptacles 26*a-i*. As shown, the LED receptacles 26*a-i* and thus the LED bars 36 are spaced equally apart from each other in the top 22 of the housing 16. More particularly, the LED bars 36 are disposed about the hole 20 and the complementary hole 24. The LED bars 36 act as targeting lights to indicate to the user when the hole 20 and the complementary hole 24 are aligned over the transmitter 14. As will be described in greater detail below, the LED bars 36 each have a plurality of LED bays 38, in this example ten (10) bays 38. As the user nears the transmitter 14 with the locator 12, the LED bays 38 near an outer perimeter of the housing 16 begin to light. When the locator 12 and its holes 20, 24 are aligned with the transmitter 14, the LED bays 38 closest to the holes 20, 24 are also lighted. In one aspect of the invention, the outermost LED bays 38 can be a red color; an inner set of the LED bays can be a yellow color; and the LED bays 38 closest to the holes 20, 24 can be a green color to indicate to the user that the locator 12 is sufficiently aligned with the transmitter 14.

Figure 4:
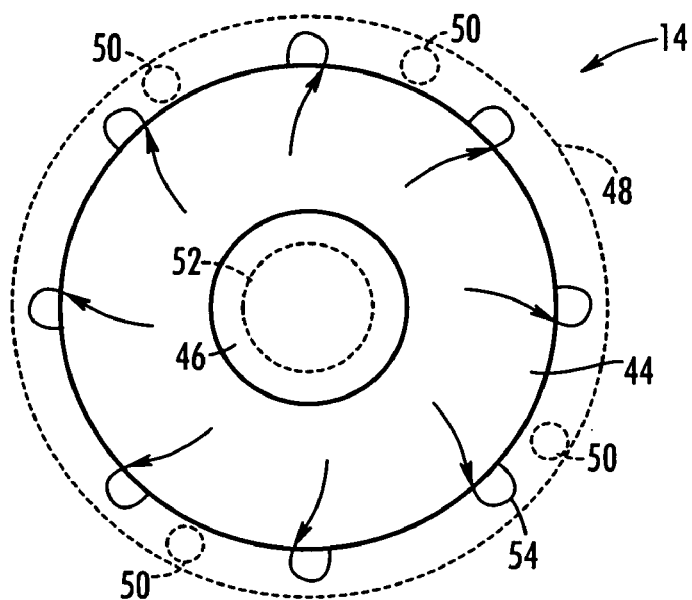
FIG. 4 is a plan view of a transmitter of the blind spot targeting system as in FIG. 2 with a cover shown in phantom for clarity.

As further shown in FIG. 2, the transmitter 14 includes a casing 48, which in this example is complementarily shaped to the emitter 44 as also shown in FIG. 4. Also in this example, the casing 48 is a non-magnetic material such as nylon to prevent interfering with the magnetic lines of flux 54 emitting from the magnet 44.

Figure 3:
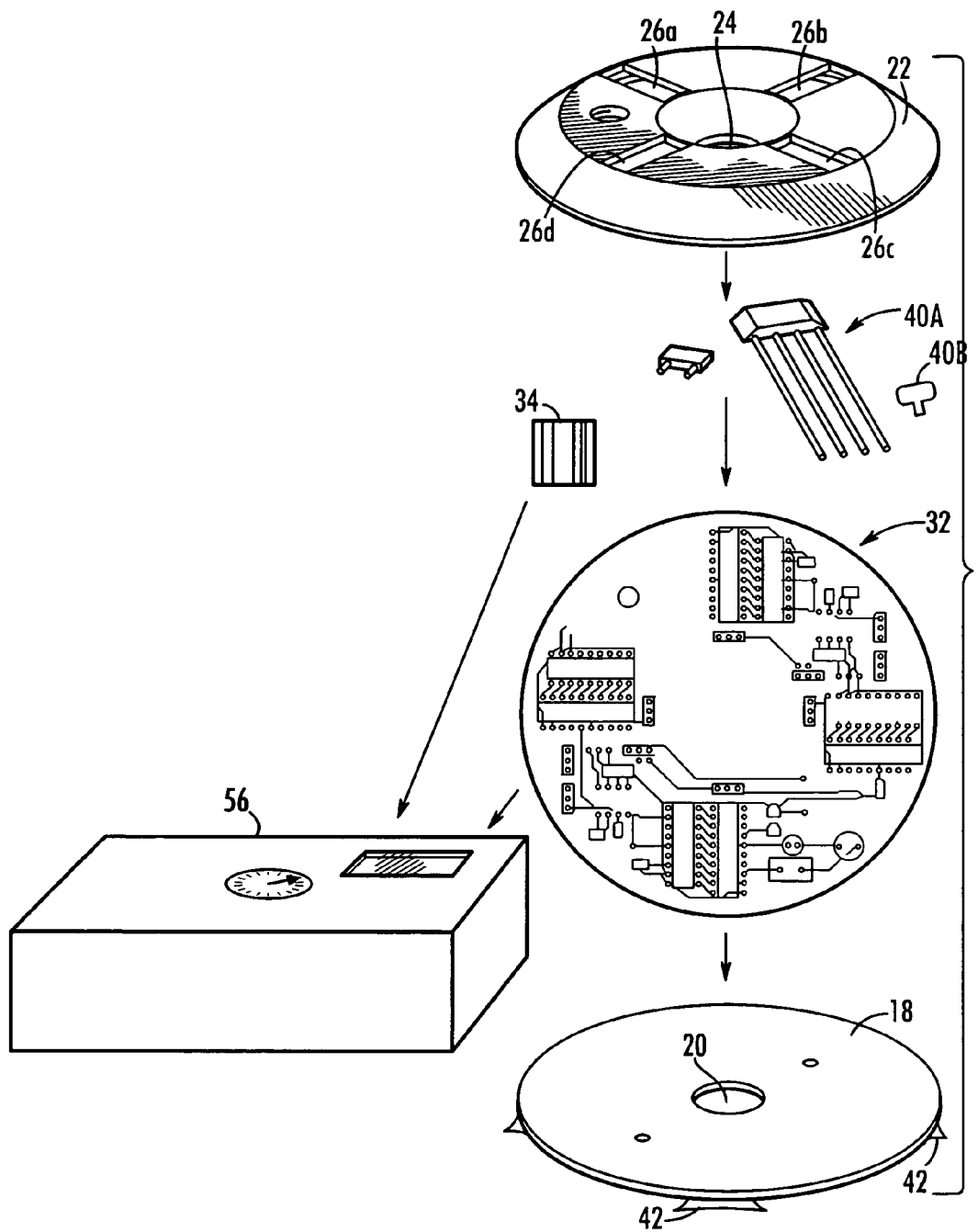
FIG. 3 is an exploded perspective view a locator of the blind spot targeting system as in FIG. 2 with various components removed for clarity.
Figure 6B:
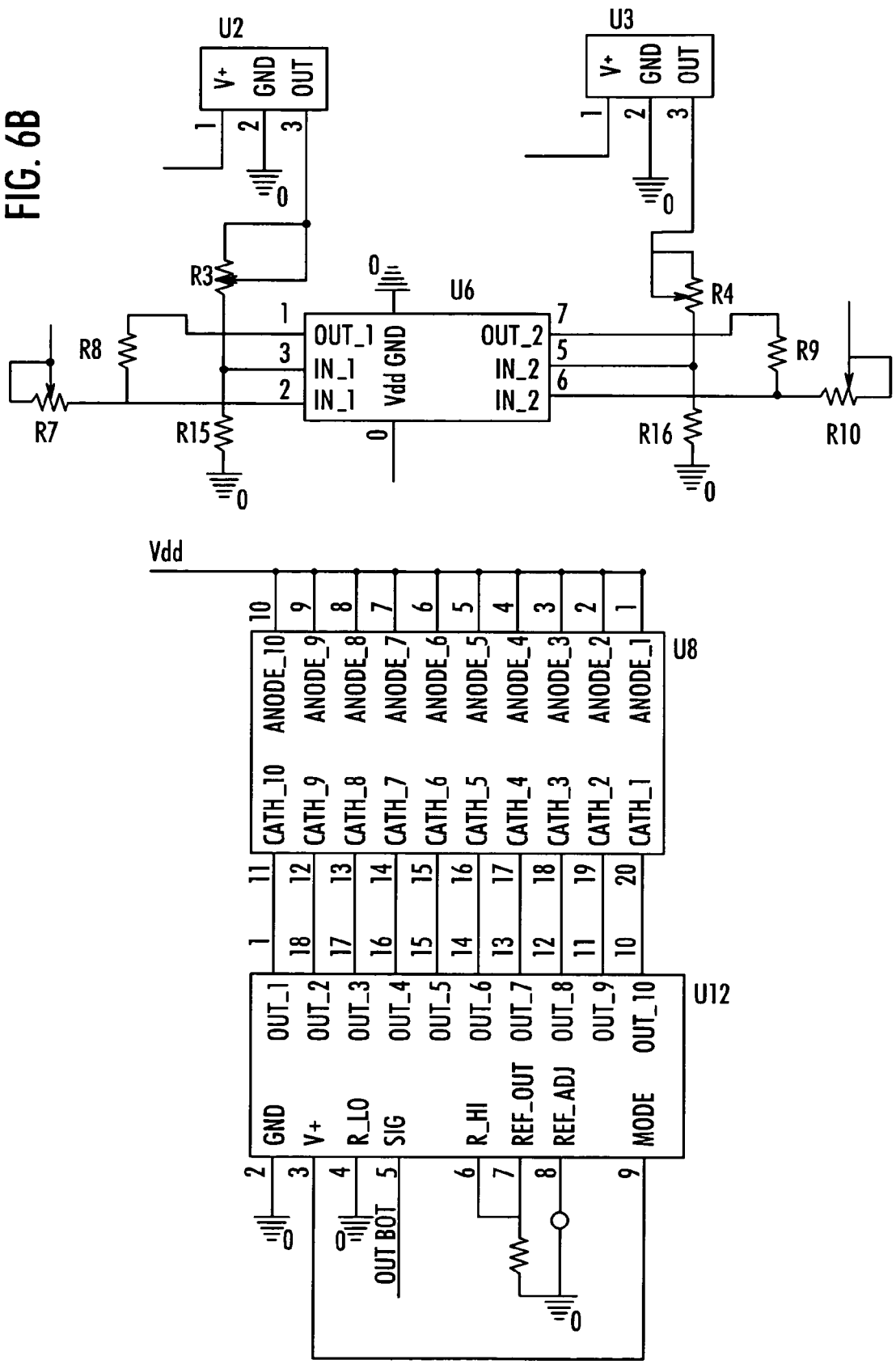
FIG. 6 shows schematic diagrams of power, Hall-effect sensors and display circuits in accordance with a further aspect of the present invention.
Figure 6C:
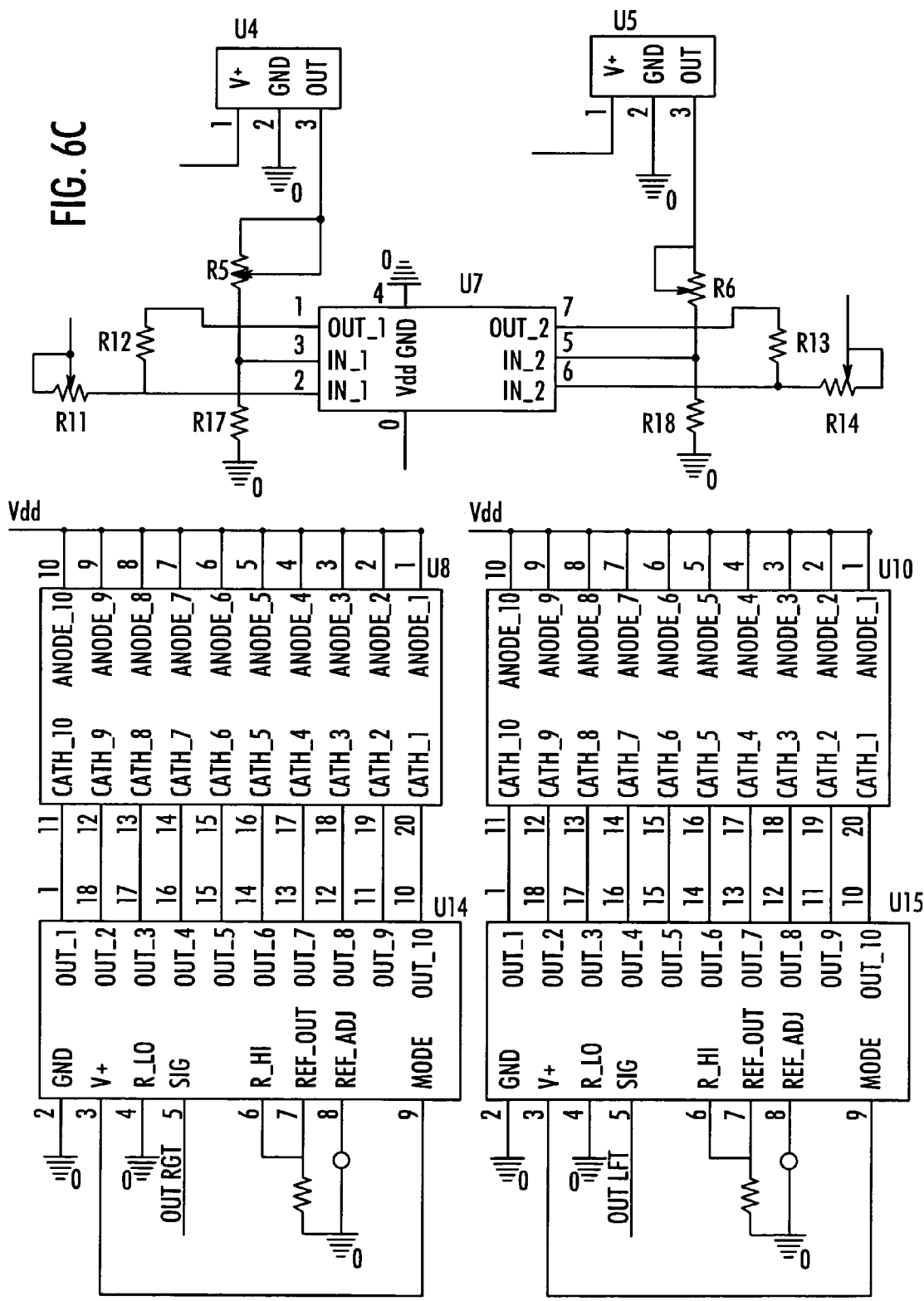

With particular reference to FIG. 3, the locator 12 is shown in a partially exploded view in which the top 22 has been removed from the base 18 to reveal a printed circuit board (PCB) 32 (see also FIG. 6). The PCB 32 includes circuitry for the locator 12 in which specific circuit elements are soldered onto the PCB 32. By way of example, the audio chip 34 is soldered to the PCB 32 as well as various resistors, potentiometers, capacitors, and amplifiers (not shown).

A Hall-effect device 40A as shown in FIG. 3 will pick up the magnetic field 54 being emitted from the magnet 44 of the transmitter 14. As known, Hall-effect characteristics relate to development of a transverse electric field in a current-carrying conductor placed in a magnetic field. Ordinarily, the conductor is positioned so that the magnetic field is perpendicular to a direction of current flow and the electric field is perpendicular to both. Thus, the strength of the magnetic field 54 produced by the magnet 44 varies with horizontal distance from the magnet 44 as well as vertical distance from the magnet 44.

Specifically, the Hall-effect device 40A in FIG. 3 is driven by the magnetic field 54 and a DC bias voltage and gives a voltage output, which is linearly proportional to the strength of the magnetic field 54 as discussed in greater detail with respect to FIG. 5 below. Although only one Hall-effect device 40A is shown in FIG. 3 by way of example, the PCB 32 will have four Hall-effect devices 40, which will sense the strength of the magnetic field 54 provided by the magnet 44 in the transmitter 14 and output a voltage to the circuit. If only one Hall-effect sensor 40 is used, the user would know when the locator 12 is directly opposite the transmitter 14 but until that point, the user would not have any information as which direction to move the locator 12. Therefore, four Hall-effect sensors in communication with the four LED bars 36 provide better targeting and placement information to the user. Thus, each corresponding LED bar 36 shows the relative strength of the signal being sensed by the Hall-effect sensor(s) located on that side(s) of the locator 12.

Figure 5:
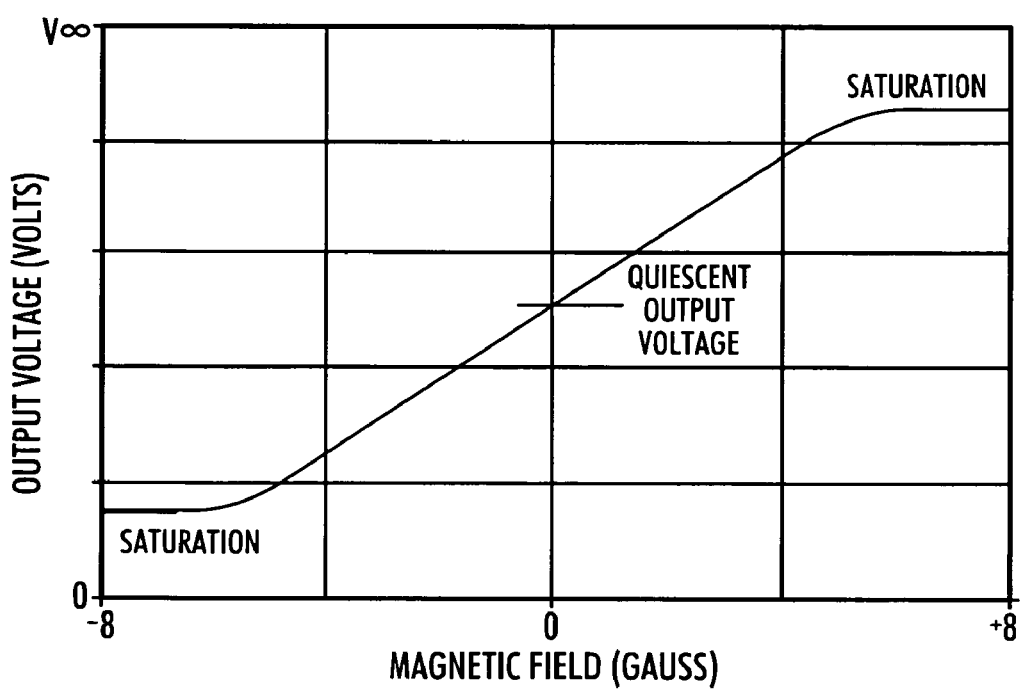
FIG. 5 is a chart showing magnetic field strength versus output voltage for a linear Hall-effect device used in the locator of the blind spot targeting system as in FIG. 2 according to another aspect of the present invention.

The output from the Hall-effect devices 40 will be fed into an amplifier (not shown) to amplify the differential linear voltage output as shown in FIG. 5. Stated another way, the Hall-effect sensors 40 transform the magnetic field information into electrical information that is communicated to the audio chip 34 and/or the LED bars 36. An exemplary Hall-effect sensor for use as the sensor 40 in this embodiment of the invention is model number A1321, provided by Allegro Micro Systems, 115 Northeast Cutoff, Worcester, Mass., although other suitable Hall-effect devices are available from a variety of other manufacturers. The model A1321 Hall-effect sensor has a quiescent (i.e., no magnetic field) output of half of the supply voltage, which in this embodiment is 2.5V. The model A1321 output rises and falls 5V to zero volts depending on the orientation of the magnetic field 54. The skilled artisan will instantly recognize that other sensors for sensing steady or pulsed magnetic fields can be used in lieu of or in addition to the Hall-effect devices 40 and therefore, the invention is not limited to Hall-effect devices.

As further shown in FIG. 3, the locator 12 also includes an alternating current (AC) field sensor 40B. The AC field sensor 40B will sense or detect a presence of an AC magnetic field for the purpose of locating electrical wires or cables within the area to be drilled in order to identify a "safe" spot to drill or cut a hole without drilling or cutting into the electrical wires. As used herein, the terms wire and cable or used interchangeably and can mean a single wire or cable or bundles thereof.

The AC field sensor 40B can also sense or detect the presence of an AC electrical field for the purpose of locating the electrical wires or cables, which have no power running through the wires or cables but which are in a live circuit. In other words, in a structure connected with a source of electrical power, no load may be connected to a specific wire or cable (e.g., no appliance plugged in and turned on) but that wire or cable will nevertheless emanate an AC electrical field, which can be used to avoid the wire or cable. When the locator 12 is turned on, the AC field sensor 40B will sense the AC magnetic fields, the AC electrical fields or both and will activate the LED bars 36 to warn the user not to drill in these areas to avoid the wire or cable. To distinguish between detection of the emitter 44 as will be further described below and electrical wires or cables, the locator 12 is programmed to flash the LED bars 36 in a specific pattern, emit a particular warning tone from the audio chip 34, or combinations of these and other warnings. Additionally, or in the alternative, a separate warning light 37 or other indicator can be provided, which is connected to the AC field sensor 40B and responsive to the sensed AC fields.

With further reference to FIG. 3, the PCB 32 is sandwiched between the base 18 and the top 22 where the base 18 and the top 22 are spun welded, snap fitted, screwed together or otherwise attached together to hold the components as shown in FIG. 2. FIG. 3 also most clearly shows one or more attachment devices 42 such as suction cups similar to the suction cups 50 of the transmitter 14 described above. Additionally, FIG. 3 shows that the locator 12, or components thereof, can be incorporated into or used with other devices 56, such as a stud finder, a laser level or the like.

With reference to FIG. 4, the emitter or magnet 44 as briefly introduced is most clearly shown inside of the casing 48, which is shown in phantom for clarity. As noted above, the transmitter 14 could use a variety of emission sources such as RF energy but a donut or toroidal shaped permanent magnet is used in this example, which emits the magnetic field 54 as shown. In this case, the magnet 44 is a neodymium permanent magnet. Neodymium, because of its high Gauss to weight ratio provides a small, passive transmitter that does not require a power supply. The field 54 produced by the magnet 44 causes the four radially positioned Hall-effect sensors 40 as described above to generate the output voltage based on the relative strength of the magnetic field 54. The skilled artisan will appreciate that a variety of other magnets could be used in place of the exemplary neodymium permanent magnet. For instance, any magnet that is not a permanent magnet, or is an electromagnet or is a pulsed electromagnet or various combinations of such magnets could be used for the magnet 44. More specifically, an electromagnet 44 can be provided, which can pulse or be made to pulse by the sensor 40 to output a DC field to differentiate its magnetic field from other nearby but unrelated magnetic fields.

FIG. 4 also shows the attachment devices such as the suction cups 50 mentioned above that are disposed about the casing 48. In this example, a plurality of suction cups 50 is provided although the skilled artisan will instantly appreciate that one large circumferential suction device or a plurality of semi-circular suction devices as well as other attachment devices could be used in place of or in addition to the suction cups 50.

Also shown in FIG. 4, the magnet 44 has a hole 46, which aligns with the complementary hole 52 of the casing 48 through which the drill bit B or other penetrating device such as a nail, screw or the like can penetrate. As shown, the hole 46 and the complementary hole 52, like the hole 20 and complementary hole 24 of the locator 12, are at least as large in diameter as the drill bit B or other penetrating device so that the drill bit B can pass safely through the locator 12 and the transmitter 14 without harming these components.

With reference now to FIGS. 2, 3 and 5, since the output voltage varies with the magnetic field strength, the output voltage from the Hall-effect devices 40 drives the output of the LED bars 36 as briefly introduced above. The number of LED bays 38 that light up on the LED bars 36 depends on the voltage driving them i.e., depending on the output voltage from the Hall-effect devices 40. As particularly shown in FIG. 5, the magnetic field strength of the magnetic field 54 is shown relative to the output voltage for the Hall-effect devices 40. As shown, the magnetic field 54 has a linear relationship when it is not in a saturation region. This linear relationship is useful in sensing distances, which is a primary purpose of the blind spot targeting system 10.

In the example shown in FIGS. 2 and 3, the locator 12 uses four independent sensor-display units including the LED bars 36 and a power supply system. The power supply system includes a power regulator (not shown) generating a 5-volt supply from a 9-volt battery such as the battery 30 introduced above. Both the battery input and the regulator output have capacitors across them to reduce noise. The battery capacitor is a ceramic 0.47 µF, and the capacitor on the output is an electrolytic 220-µF capacitor. Since the LED bars 36 also need a 2.5-volt source, a voltage divider with two 33 kilo resistors wired between supply and ground is included on the printed circuit board 32. If there is a variable amount of input resistance based on the gains of the system's amplifiers, a potentiometer can be added from the middle of the two resistors back to the supply. This extra resistance cancels the input resistance of the sensor display circuits and provides a proper 2.5-volt source.

Using the model 1321 Hall-effect device 40A, the output stage includes the LED bar 36 with the ten LED bays 38. National Semiconductor supplies an array of LED bar driver chips, which remove any need for voltage dividing circuitry. Part number LM 3915 from National Semiconductor has a logarithmic response, which is preferable because the magnetic field strength falls off exponentially as the distance from the magnet 44 to the locator 12 and its Hall-effect devices 40 increases. The LM 3915 accepts and input from zero to 1.2 volts and lights the LED bays 38 logarithmically along the 1.2-volt scale.

FIG. 6 shows schematic drawings of the above-described battery 30, the Hall-effect device 40A and the LED bars 36. These schematics will be understood from the following prototype design and construction example.

EXAMPLE

To construct a prototype of the blind spot targeting system 10, preliminary measurements indicated a need to amplify a sensor signal to power the LED bars 36 as well as to remove a 2.5-volt quiescent signal. Since original estimates placed desired gain at about 25, a single-stage differential amplifier was selected for all amplification, and designed around a rail-to-rail, low-power, single-supply op amp such as model TLV2452 available from Texas Instruments, 12500 TI Boulevard Dallas, Tex. The gain of about 25 was estimated assuming the Hall-effect sensors would have a swing between 2.5 and 2.55.

Since the TI chip has two amplifiers inside, each chip was tied to two sensor-display systems. To remove the 2.5-volt quiescent signal, a 2.5-volt source (from the power circuit) was placed onto one side of the differential amplifier such that the amplifier would amplify the remaining signal based on the ratio of the feedback resistors to the input resistors. See, e.g., FIG. 6 for circuit design details.

To achieve the desired gain noted above, an 18kΩ feedback resistor and 10kΩ potentiometers were selected to be able to vary the gain in order to tune the system to get a better response. The potentiometers were fortuitous since gain specifications were over an order of magnitude too low as discussed below.

After putting the four sensor-display modules 36 together, the four modules in parallel reduced overall gain in each system, and the response from the Hall-effect sensors 40 was smaller at the maximum distance than originally estimated (the sensor did not quite have a 0.05-volt swing). Accordingly, calculated gain was increased to around 350, but this reached the limit of the op amps. Since the prototype board had already been designed, another gain stage could not easily be added. To alleviate these problems, smaller potentiometers were added, and the system was slowly tuned to achieve an acceptable response. While this was workable for the prototype, the four modules are better isolated in a final product, which also uses more stages in amplification and subtraction of the quiescent voltage.

In the final stages, another problem was realized: the chosen Hall-effect sensors did not all have the same properties. The quiescent voltages were different on each sensor, and the response varied slightly between each. This problem was addressed with the potentiometers by slightly tuning the amplifiers. In a production environment, better tolerances on the sensors can be specified. Additional circuits can also be added, such as a feedback circuit, to automatically compensate for sensor differences (batch tolerances) to provide substantially equal output of each device.

Additionally, with the high gain of the prototype, noise was an issue. A significant amount of noise was reduced by placing 0.47 uF ceramic capacitors across each of the feedback resistors (the capacitors were soldered to the back of the board). This reduced almost all of the noise for prototype purposes. By placing capacitors on the Hall-effect sensors, it seems possible to slow down their response and further reduce the noise. By reducing the single-stage gain in the amplification systems, many noise problems will also disappear.

Further aspects of the invention may be better understood with further reference now to the figures and to a method of operation and use.

As briefly introduced above, the transmitter 14 can be placed over a hole or a location of a future hole on a side $W_1$ of a wall or other surface W using suction cups 50 or other attachment devices. The blind spot targeting system 10 is useful through wood or wallboard from about 5 inches to about 15 inches in thickness. However, an increase in the size of the magnet 44 and power in the locator 12 can increase the sensitivity and the range of the blind spot targeting system 10. Thus, these distances are by way of example only.

The user will then take the locator 12 to the opposing side $W_2$ of the wall W and turn the locator 12 on by the on and off switch 28. The user will grossly approximate the position of the transmitter 14 on the side of the wall $W_1$ and move the locator 12 to that position. The LED bars 36 and their bays 38 are of course positioned where the user can view them; i.e., facing away from the wall $W_2$. The user will then move the locator 12 near a surface of the wall $W_2$ until at least one of the outer bays 38 emit a light L such as a red colored light and/or the audio chip 34 begins chirping. The user should move the locator 12 in a direction of the lighted bays 38 until additional bays 36 such as middle-positioned yellow bays begin to light and/or the audio chip 34 begins to chirp louder and/or faster. The user will finally move the locator 12 substantially over the surface of the wall $W_2$ aligned with the transmitter 14 on the opposing wall $W_1$ such that the final bays 38 light up; i.e., in a green colored light, and the audio tone from the audio chip 34 becomes a steady tone and/or a louder tone. In practice, if only one set of the LED bars 36 are lit, the user should move the locator 12 in a direction of the lit LED bars 36 until the other LED bars 36 spaced around the locator 12 light up in a manner as described above. When the LED bars 36 and their bays 38 are evenly lit, and/or the audio tone has become a loud steady tone, the locator 12 is substantially directly over the transmitter 14 (within about ¼ inch or less of the transmitter 14) and the point is ready to be marked and drilled. In one aspect of the invention, a dead-man's pressure-type switch is used for the on and off switch 28, so when the user releases the on and off switch 28 either to mark the reference point or simply to put the locator 12 in storage, the on and off switch 28 will automatically break the circuit and turn the locator 12 off so as to conserve power.

Although the invention has been described in such a way as to provide an enabling disclosure for one skilled in the art to make and use the invention, it should be understood that the descriptive examples of the invention are not intended to limit the present invention to use only as shown in the figures. For instance, the housing 16 of the locator 12 can be shaped as a square, an oval, or in a variety of other shapes. Likewise, as noted above, different emitters and sensors can be used other than the permanent magnets and Hall-effect devices as described herein. It is intended to claim all such changes and modifications as fall within the scope of the appended claims and their equivalents. Thus, while exemplary embodiments of the invention have been shown and described, those skilled in the art will recognize that changes and modifications may be made to the foregoing examples without departing from the scope and spirit of the invention.

That which is claimed is:

1. A construction device for establishing a reference point on a structure, the construction device comprising:
   a housing with an indicator disposed thereon;
   a signal sensing device connectable to the housing, the indicator being in electronic communication with the signal sensing device for indicating a drilling point on a first side of a structure; and
   an emitter being configured for placement on a second side of the structure for emitting a signal therefrom, the signal sensing device being configured to sense the signal emitted from the emitter and being further configured to communicate the sensed signal to the indicator to indicate alignment of the signal sensing device and the emitter for drilling into the first side of the structure in a direction of the emitter as the emitter emits the signal from the second side of the structure,
   wherein the indicator includes at least four light emitting diode bars spaced equally apart about the housing, each of the four light emitting diode bars having at least two light emitting diode bays, at least one of the first light emitting diode bays being configured to emit light when the signal sensing device senses the emitted signal, the second light emitting diode bays being configured to emit light when the signal sensing device and the emitter are aligned.

2. The blind spot targeting system as in claim 1, wherein the signal-sensing device includes a Hall-effect device being configured to sense the emitted signal from the emitter.

3. The blind spot targeting system as in claim 2, wherein the emitter includes a magnet, the Hall-effect device being configured to sense a magnetic field emitted from the magnet.

4. The blind spot targeting system as in claim 1, further comprising an audio device.

5. The blind spot targeting system as in claim 4, wherein the audio device is configured to emit a sound from about fifteen inches to about ten inches proximate the emitter.

6. The blind spot targeting system as in claim 4, wherein the audio device is configured to emit a chirping tone from about fifteen inches to about ten inches proximate the emitter.

7. The blind spot targeting system as in claim 6, wherein the audio device being proximate about ten inches to about one inch from the emitter increases a rate of the chirping tone.

8. The blind spot targeting system as in claim 6, wherein the audio device being proximate about ten inches to about one inch from the emitter increases a loudness level of the chirping tone.

9. The blind spot targeting system as in claim 4, wherein the audio device is configured to emit a steady tone from about 0.25 inches to about one inch proximate the emitter.

10. The blind spot targeting system as in claim 1, further comprising a power switch being configured to turn the signal-sensing device on and off.

11. The blind spot targeting system as in claim 1, further comprising a power source being configured to power the signal-sensing device.

12. The blind spot targeting system as in claim 1, further comprising means for attaching the emitter to the structure.

13. The blind spot targeting system as in claim 12, wherein the means for attaching the emitter to the structure is selected from one of a suction cup, an adhesive tape, a pin, a nail, a hook, or a hook and a loop fastening system.

14. The blind spot targeting system as in claim 1, further comprising means for attaching the signal-sensing device to the structure.

15. The blind spot targeting system as in claim 14, wherein the means for attaching the signal-sensing device to the structure is selected from one of a suction cup, an adhesive tape, a pin, a nail, a hook, or a hook and a loop fastening system.

16. A construction device for establishing a reference point on a structure, the construction device comprising:
 a housing with an indicator disposed thereon;
 a signal sensing device connectable to the housing, the indicator being in electronic communication with the signal sensing device for indicating a drilling point on a first side of a structure, the signal sensing device being configured to sense an electrical field emanating from an electrical cable proximate the drilling point, the indicator being activated by the electrical field sensed by the signal sensing device to indicate a position of the electrical cable for avoidance of the electrical cable; and
 an emitter being configured for placement on a second side of the structure for emitting a signal therefrom, the signal sensing device being further configured to sense the signal emitted from the emitter and being configured to communicate the sensed signal to the indicator to indicate alignment of the signal sensing device and the emitter for drilling into the first side of the structure in a direction of the emitter as the emitter emits the signal from the second side of the structure,
 wherein the indicator includes at least four light emitting diode bars spaced equally apart about the housing, each of the four light emitting diode bars having at least two light emitting diode bays, at least one of the first light emitting diode bays being configured to emit light when the signal sensing device senses the emitted signal, the second light emitting diode bays being configured to emit light when the signal sensing device and the emitter are aligned.

17. The construction device as in claim 16, wherein the construction device is selected from the group consisting of a stud finder, a laser level, a blind spot targeting system and combinations thereof.

18. The blind spot targeting system as in claim 16, wherein the signal sensing device is configured to sense an AC field emanating from an electrical cable proximate the drilling point, the indicator being activated by the AC field sensed by the signal sensing device to indicate a position of the electrical cable for avoidance of the electrical cable.

19. The blind spot targeting system as in claim 16, wherein the signal from the emitter is a magnetic field signal.

20. The blind spot targeting system as in claim 16, wherein the signal from the emitter is a DC signal.

21. A blind spot targeting system for establishing a reference point on a structure, the blind spot targeting system comprising:
 a locator including a housing defining a hole therethrough;
 an indicator connected to the housing;
 a signal sensing device disposed in the housing, the indicator being in electronic communication with the signal sensing device for indicating a drilling point on a first side of a structure, the signal sensing device being configured to sense an AC field emanating from an electrical cable proximate the drilling point, the indicator being activated by the AC field sensed by the signal sensing device to indicate a position of the electrical cable for avoidance of the electrical cable; and
 an emitter defining a complementary hole therethrough, the emitter being configured for placement on a second side of the structure for emitting a signal therefrom, the signal sensing device being further configured to sense the signal emitted from the emitter and being configured to communicate the sensed signal to the indicator to indicate alignment of the hole and the complementary hole, the locator being further configured for drilling through the hole into the first side of the structure in a direction of the complementary hole as the emitter emits the signal from the second side of the structure,
 wherein the indicator includes at least four light emitting diode bars spaced equally apart about the housing, each of the four light emitting diode bars having at least two light emitting diode bays, at least one of the first light emitting diode bays being configured to emit light when the signal sensing device senses the emitted signal, the second light emitting diode bays being configured to emit light when the signal sensing device and the emitter are aligned.

22. The construction device as in claim 21, wherein the construction device is selected from the group consisting of a stud finder, a laser level, a blind spot targeting system and combinations thereof.

23. The blind spot targeting system as in claim 21, wherein the electrical field emanating from the electrical cable includes a DC field.

24. The blind spot targeting system as in claim 21, wherein the signal from the emitter is a magnetic field signal.

25. The blind spot targeting system as in claim 21, wherein the signal from the emitter is an AC or DC signal.

* * * * *